M. L. EMET.
UNIVERSAL JOINT AND METHOD OF MAKING THE SAME.
APPLICATION FILED APR. 28, 1921.

1,421,072.

Patented June 27, 1922.

UNITED STATES PATENT OFFICE.

MATTS L. EMET, OF SPRINGFIELD, MASSACHUSETTS.

UNIVERSAL JOINT AND METHOD OF MAKING THE SAME.

1,421,072. Specification of Letters Patent. Patented June 27, 1922.

Application filed April 28, 1921. Serial No. 465,261.

*To all whom it may concern:*

Be it known that I, MATTS L. EMET, a citizen of the United States of America, and a resident of Springfield, in the county of Hampden and State of Massachusetts, have invented a new and useful Universal Joint and Method of Making the Same, of which the following is a specification.

My invention relates to improvements in devices for connecting driven shafts with driving shafts in such a manner that said shafts have angular relationship. This universal-joint comprises a ball and two shaft-heads or couplers provided with pluralities of interengaging or interfitting projections or fingers each of which loosely engages and partially embaces said ball, to the end that said couplers may assume an angular relationship to each other and be rotated in such position, and this without means other than the parts and members themselves, which have just been mentioned, to hold said couplers together or unite them so that they cannot become separated under normal conditions. And the method consists in assembling a ball and couplers, which latter have therein concavities for the reception of said ball, and are provided with pluralities of fingers that at their outer ends are separated sufficiently to permit of the passage of said ball, such fingers being ductile, such members being assembled with the ball within said fingers and in said concavities, and said fingers in intergaging relationship, in forcing inwardly the outer terminals of said fingers, so that the fingers of either coupler engage the ball beyond or outside the axial plane thereof which is at right-angles to the longitudinal axis of such coupler, and in hardening said fingers.

The primary object of my invention is to provide a comparatively simple and inexpensive, yet strong and durable, universal-joint, which consists of few parts, is compact, capable of affording the desired degree of angularity, and withal highly efficient and serviceable.

Other objects and advantages will appear in the course of the following description.

I attain the objects and secure the advantages of my invention by the means illustrated in the accompanying drawings, in which—

Figure 1:
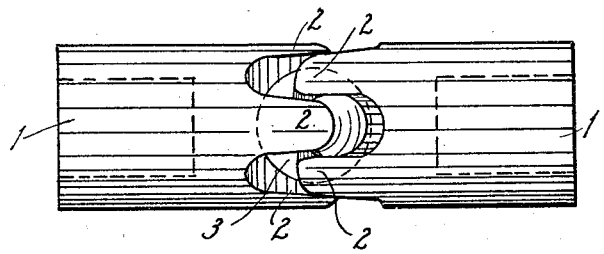
Figure 2:
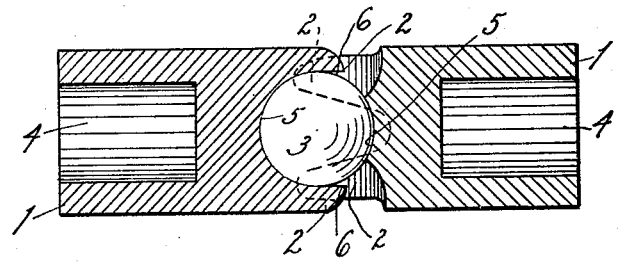
Figure 3:
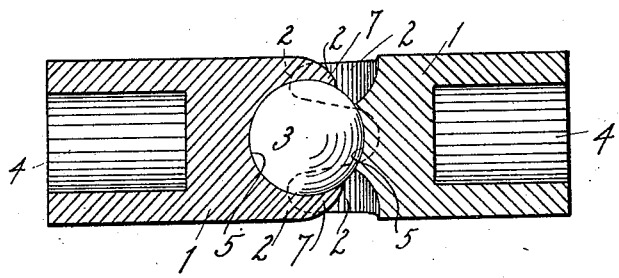

Figure 1 is a side elevation of a universal-joint which embodies a practical form of my invention; Fig. 2, a central, longitudinal section through said universal-joint before the outer terminals of the fingers are bent inwardly into engagement with the ball, and, Fig. 3, a similar section taken after said terminals have been caused to engage said ball, the same being a true section of Fig. 1.

Similar reference characters designate similar parts throughout the several views.

In the drawings, I show two cylindrical shaft-heads or couplers 1, each consisting of a single piece of stock and provided at one end with a plurality, four in the present case, of projections or fingers 2, and a ball 3. The couplers 1 are designed to be secured to the adjacent ends of two shafts (not shown), and for this purpose said couplers may be provided with recesses 4 opening through their outer ends to receive said terminals of such shafts, or said couplers may be connected in any other suitable manner and by any other suitable means with their shafts.

The inner end of each coupler 1 is cupped or concaved, as represented at 5, to fit and receive the ball 3 or portions thereof. The cupped portion or recess 5 of each coupler 1 is at the bases or roots of the integral fingers 2, and said fingers are interiorly concave and with said cupped portion or recess form a semi-spherical receptacle of the required size to receive one-half of the ball 3. The fingers 2, which enter into the formation of the aforesaid semi-spherical receptacle, in each case, extend initially beyond said receptacle, as represented at 6 in Fig. 2, and the inner faces of the extended portions are parallel or substantially parallel with the longitudinal axis of the coupler 1, of which said fingers form parts, although said extended portions are transversely concave to correspond with the exterior surface of the ball 3. When the parts and members are assembled and the universal-joint completed, the terminals 6 of the fingers 2 are forced inwardly into contact with the ball 3, as best represented at 7 in Fig. 3. It will now be seen that, not only is one hemisphere of the ball 3 seated in the receptacle formed by the recess 5 in and portions of the fingers 2 of each coupler 1, but that the terminal portions 7 of said fingers engage said ball beyond or outside of the axial plane thereof which is at right-angles to the longitudinal axis of said coupler, so that said ball can not be withdrawn from the socket provided to receive it in either coupler, and the couplers can not be disengaged or disconnected from said ball.

Except for the recesses 5 and the fingers 2, the inner ends of the couplers 1 are solid or imperforate, and preferably the exterior surfaces of said fingers do not project beyond the peripheries of the other portions of said couplers.

The fingers 2 from one coupler 1 extend beyond the fingers 2 from the other coupler 1 when the parts are assembled, consequently the fingers of one coupler must engage the fingers of the other coupler, when either coupler is rotated, with the result that rotation from one coupler is imparted to the other coupler. The ball is held loosely within the sockets provided for it, and there is thus produced a connection that is of a nature to permit great freedom of movement between the universal-joint members. The two sets of fingers 2, retained in interengaging relationship as they are by the ball 3, may be revolved with their couplings, while the latter are angularly positioned relatively, and while rotary motion is imparted from one set to the other.

The extreme outer terminals of the fingers 2 are rounded more or less in order to increase the working angularity between the couplers.

In carrying out the method whereby this unversal-joint is produced, I assemble the couplers 1 and the ball 3, while said couplers or in any event the fingers 2 thereof are in a soft or annealed condition, then by means of suitable forming tools or implements I force the terminals 6 of said fingers inwardly to loosely contact with said ball, and finally harden said couplers or fingers. After being hardened it is impossible to withdraw either set of fingers from the ball, or to separate the couplers from each other, without breaking or seriously damaging the finger terminals 7.

More or less change in the size, shape, and minor structural features of this device may be made without departing from the spirit of my invention or exceeding the scope of what is claimed.

I am aware that balls have been used before in universal-joint construction, but am not aware that balls have been used in a construction of this character wherein the balls become the means of retaining the couplers together, as well as serving as the fulcrum or bearing members therefor. Through the instrumentality of said last-mentioned construction, which is my construction, the number of parts and members required is greatly reduced, and the universal-joint is very much more compact, and of light weight.

What I claim as my invention, and desire to secure by Letters Patent, is—

1. As an improved article of manufacture, a universal-joint comprising couplers provided with interfitting fingers, and a ball between said couplers and fingers, the latter being bent into confining relationship with said ball, and each of said couplers with its fingers consisting of a single piece of stock.

2. As an improved article of manufacture, a universal joint comprising couplers having imperforate cupped inner terminals provided with interfitting fingers, each of said couplers with its fingers consisting of a single piece of stock, and a ball between said couplers and fingers, said fingers of either coupler engaging said ball outside of the axial plane thereof which is at right-angles to the longitudinal axis of such coupler.

3. A method of making universal-joints consisting in assembling a pair of couplers which are recessed and provided with annealed interfitting fingers, each coupler with its fingers consisting of a single piece of stock, and a ball, the latter being between said fingers in the recesses in said couplers, in forcing the outer terminal portions of said fingers into confining relationship with said ball, and in hardening said fingers.

MATTS L. EMET.

Witnesses:
F. A. CUTTER,
C. D. MONROE.